(12) United States Patent
Fleischer et al.

(10) Patent No.: US 7,730,117 B2
(45) Date of Patent: Jun. 1, 2010

(54) SYSTEM AND METHOD FOR A FLOATING POINT UNIT WITH FEEDBACK PRIOR TO NORMALIZATION AND ROUNDING

(75) Inventors: Bruce M. Fleischer, Bedford Hills, NY (US); Juergen Haess, Schoenaich (DE); Michael Kroener, Ehningen (DE); Martin S. Schmookler, Austin, TX (US); Eric M. Schwarz, Gardiner, NY (US); Son Dao-Trong, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 11/054,110

(22) Filed: Feb. 9, 2005

(65) Prior Publication Data

US 2006/0179097 A1     Aug. 10, 2006

(51) Int. Cl.
  *G06F 7/38* (2006.01)
  *G06F 15/00* (2006.01)
(52) U.S. Cl. .................. 708/497; 708/205; 708/508
(58) Field of Classification Search .............. 708/490, 708/495, 497, 205, 508
See application file for complete search history.

(56) References Cited

U.S. PATENT DOCUMENTS

| | | | |
|---|---|---|---|
| 4,999,802 A | | 3/1991 | Cocanougher et al. |
| 5,631,859 A | * | 5/1997 | Markstein et al. ........... 708/513 |
| 5,659,495 A | * | 8/1997 | Briggs et al. ................ 708/523 |
| 5,696,711 A | | 12/1997 | Makineni |
| 5,880,984 A | * | 3/1999 | Burchfiel et al. ............ 708/497 |
| 6,044,454 A | | 3/2000 | Schwarz et al. |
| 6,148,314 A | | 11/2000 | Matheny et al. |
| 6,697,832 B1 | | 2/2004 | Kelley et al. |
| 2002/0107900 A1 | * | 8/2002 | Enenkel et al. .............. 708/497 |
| 2004/0143613 A1 | | 7/2004 | Clemen et al. |

OTHER PUBLICATIONS

Montoye et al., "Design of the IBM RISC System/6000 Floating-Point Execution Unit," IBM Journal of R&D, vol. 34, No. 1, pp. 59-70, Jan. 1990.

* cited by examiner

*Primary Examiner*—Chat C Do
(74) *Attorney, Agent, or Firm*—Cantor Colburn LLP; John Campbell

(57) ABSTRACT

A system for performing floating point arithmetic operations including an input register adapted for receiving an operand. The system also includes a mechanism for performing a shift or masking operation in response to determining that the operand is in an un-normalized format. The system also includes instructions for performing single precision incrementing of the operand in response to determining that the operand is single precision, that the operand requires the incrementing based on the results of a previous operation and that the previous operation did not perform the incrementing. The operand was created in the previous operation. The system further includes instructions for performing double precision incrementing of the operand in response to determining that the operand is double precision, that the operand requires the incrementing based on the results of the previous operation and that the previous operation did not perform the incrementing.

20 Claims, 6 Drawing Sheets

SYSTEM AND METHOD FOR A FLOATING POINT UNIT WITH FEEDBACK PRIOR TO NORMALIZATION AND ROUNDING

TRADEMARKS

IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

This invention relates generally to computer systems, and more particularly, to computer systems providing floating-point operations.

The "IEEE-754 Standard for Binary Floating-point Arithmetic" specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by a "e," is 8 bits long for single format and 11 bits long for double format. The significand is 24 bits long for single format and 53 bits long for double format. The most significant bit of the significand is implied from the value of the exponent. The lesser significant bits of the significand or fraction are represented by "F" in equations (1) and (2) that follow. If the unsigned biased exponent "e" is not equal to zero and does not have all bits set to one, then the value of the floating-point number is given by the following equation:

$$(-1)^S \times (1).F \times 2^{(C-Bias)} \qquad (1)$$

Numbers within this range are called normalized numbers and they have an implied one at the beginning of the significand. Numbers outside this range are considered to be special numbers. There are four types of special numbers defined in the IEEE-754 Standard. Three of these special numbers are handled easily by the hardware since their value dictates the resultant value with little or no arithmetic computation. These three special numbers are zero, infinity and not-a-number ("NaN"). The fourth type of special number is a de-normalized number that is indicated by an unsigned biased exponent, e, equal to zero and a non-zero fraction. The value of the fourth special number is given by the following equation:

$$(-1)^S \times (0).F \times 2^{(1-Bias)} \qquad (2)$$

In contrast with the normalized format, there is no implied one preceding the fraction in this de-normalized format. In order to determine that the data is de-normalized, the characteristic must be examined. This is important since the computation that is performed by the hardware is typically serially gated by the predetermination of de-normalized input data that will contribute to the cycle time of the hardware, as is the case of multiplication. The handling of de-normalized input data is a particular problem for floating point processors that do not have any pre-decoded information that an operand is de-normalized, particularly where the assumption is that an input operand is normalized.

One of the key performance factors in designing high performance floating-point units (FPUs) is the number of cycles required to resolve a dependency between two successive operations. For example, an overall latency for a fused multiply-add operation may be seven cycles with a throughput of one operation per cycle per FPU. In this type of pipeline, it is typical that an operation that is dependent on the result of the prior operation will have to wait the whole latency of the first operation before starting (in this case seven cycles).

Currently, some FPUs perform fused multiply-add operations that support limited cases of data dependent operations by delaying the dependent operations until after the rounded intermediate result is calculated. For example, U.S. Pat. No. 4,999,802 to Cocanougher et al., of common assignment herewith, depicts a mechanism for allowing an intermediate result prior to rounding to be transmitted to a new dependent instruction and later corrected in the multiplier. This mechanism supports an intermediate result prior to rounding to be fed back to the multiplier for double precision data.

Improvements in performance could be achieved by providing early un-rounded feed back for multiple data types (i.e. single precision and double precision) and by allowing a dependency in both the multiplier input operands, as well as the addend input operand. Additional performance improvements may be achieved by feeding back an un-rounded un-normalized result prior to some or all of the normalization.

BRIEF SUMMARY OF THE INVENTION

Exemplary embodiments of the present invention include a system for performing floating-point arithmetic operations. The system includes an input register adapted for receiving an operand and a mechanism for performing a masking or shift operation in response to determining that the operand is in an un-normalized format and may have extra bits of precision that must be masked. The system also includes a mechanism for performing single precision incrementing of the operand in response to determining that the operand is single precision, that the operand requires the incrementing based on the results of a previous operation and that the previous operation did not perform the incrementing. The operand was created in the previous operation. The system further includes a mechanism for performing double precision incrementing of the operand in response to determining that the operand is double precision, that the operand requires the incrementing based on the results of the previous operation and that the previous operation did not perform the incrementing.

Additional exemplary embodiments include a system for performing floating point arithmetic operations. The system includes an input register adapted for receiving a plurality of operands and a mechanism for performing a masking or shift operation in response to determining that the operand is in an un-normalized format and may have extra bits of precision that must be masked. The system also includes a mechanism for performing single precision incrementing of one or more of the plurality of operands in response to determining that the operand is single precision, that the operand requires the incrementing based on the results of a previous operation and that the previous operation did not perform the incrementing. The system further includes a mechanism for performing double precision incrementing of one or more of the plurality of operands in response to determining that the operand is double precision, that the operand requires the incrementing based on the results of the previous operation and that the previous operation did not perform the incrementing.

Additional exemplary embodiments include a method for performing floating-point arithmetic operations. The method includes performing a masking or shift operation on the operand in response to determining that the operand is in an un-normalized format and may have extra bits of precision that must be masked. The method also includes performing single precision incrementing of an operand in response to determining that the operand is single precision, that the operand requires the incrementing based on the results of a previous operation and that the previous operation did not perform the incrementing. The operand was created in the previous operation. The method further includes performing double precision incrementing of the operand in response to determining that the operand is double precision, that the operand requires the incrementing based on the results of the previous operation and that the previous operation did not perform the incrementing.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
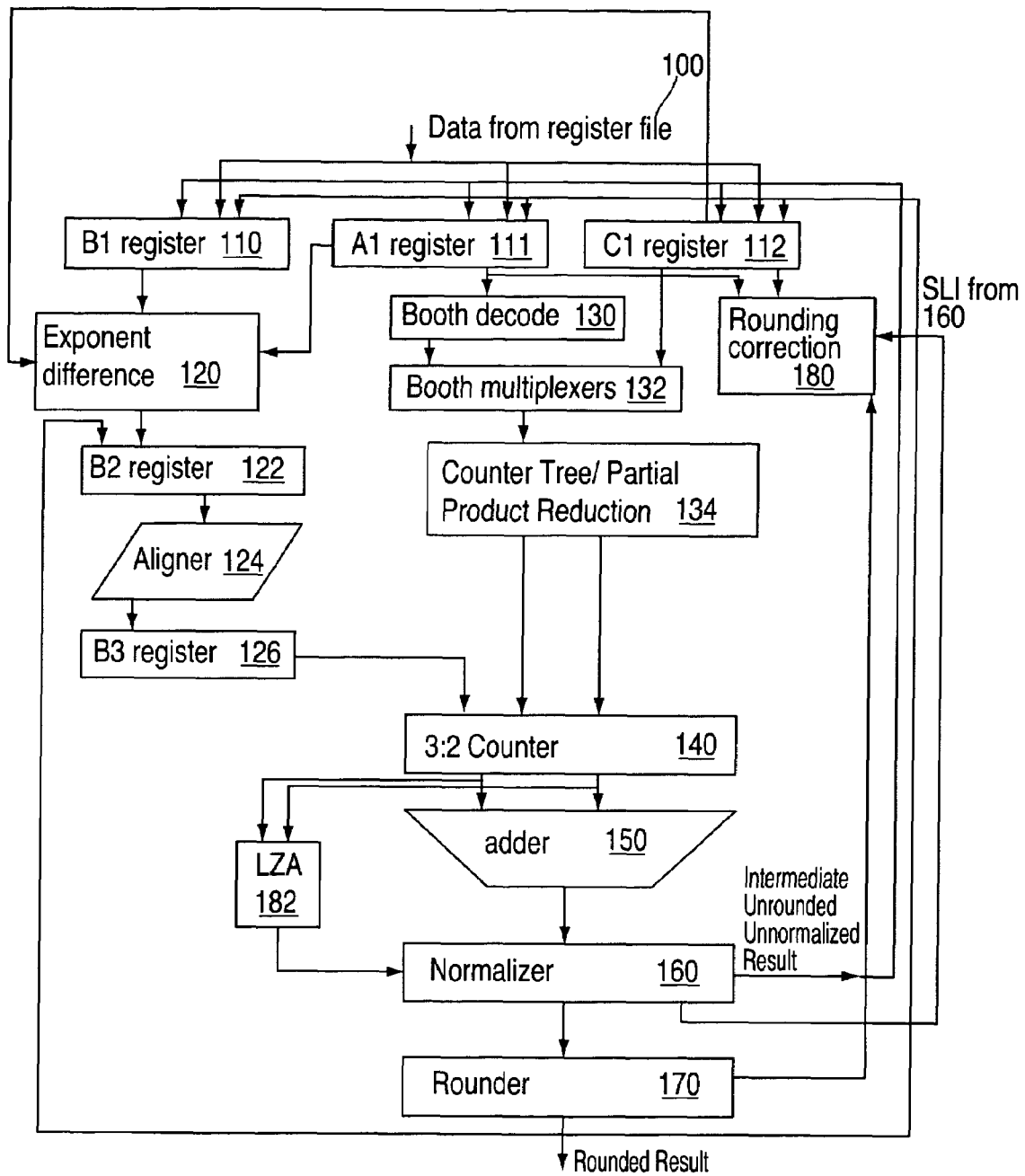
FIG. 1 is a block diagram of an exemplary floating point unit (FPU) that may be utilized by exemplary embodiments of the present invention.

The detailed description explains the preferred embodiments of the invention, together with advantages and features, by way of example with reference to the drawings.

DETAILED DESCRIPTION OF THE PREFERRED EMBODIMENTS

Exemplary embodiments of the present invention are concerned with optimizing the hardware for dependent operations, where one fused multiply-add operation depends on a prior fused multiply-add operation. A fused multiply-add dataflow implements the equation T=B+A*C where A, B, and C are three input operands and T is the target or result of the multiply-add operation. A may be referred to as the multiplier, C as the multiplicand and B as the addend. The multiply-add operation is considered fused since it is calculated with one rounding error rather than one for multiply, as well as one for the addition operation.

In exemplary embodiments of the present invention, the three operands are binary floating-point operands defined by the IEEE 754 Binary Floating-Point Standard. The IEEE 754 standard defines a 32-bit single precision and a 64-bit double precision format. The IEEE 754 standard defines data as having one sign bit that indicates whether a number is negative or positive, a field of bits that represent the exponent of the number and a field of bits that represent the significand of the number.

In exemplary embodiments of the present invention, the input operands (i.e. A, B and C) can be either single or double precision (e.g., A and B are single precision and C and T are double precision or any other combination) and the target (T) is defined by the instruction text to be either single or double precision. In addition, exemplary embodiments of the present invention have the capability of handling dependencies for all three operands. An intermediate, un-rounded un-normalized result may be provided to any of the three operands (i.e. A, B and C).

The seven cycle pipeline of a fused multiply-add dataflow may be labeled using F1, F2, F3, F4, F5, F6, and F7 to indicate each pipeline stage. It is typical that normalization completes in the next to last stage of the pipeline, in this case F6. And, it is typical for the last stage, F7, to perform rounding to select between the normalized result and the normalized result incremented by one unit in the last place. Without feeding back early un-rounded un-normalized results, a typical pipeline flow of two dependent fused multiply-add operations would occur as follows:

|  | Cycles | | | | | | | | | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 |
| r5 <- r1*r2 + r3 | F1 | F2 | F3 | F4 | F5 | F6 | F7 | | | | | | | |
| r6 <- r5*r2 + r7 | | | | | | | | F1 | F2 | F3 | F4 | F5 | F6 | F7 |

By utilizing providing un-rounded data feed back, the pipeline flow of two dependent fused multiply-add operations would occur as follows:

|  | Cycles | | | | | | | | | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 |
| r5 <- r1*r2 + r3 | F1 | F2 | F3 | F4 | F5 | F6 | F7 | | | | | | | |
| r6 <- r5*r2 + r7 | | | F1 | F2 | F3 | F4 | F5 | F6 | F7 | | | | | |

As depicted by the above sequences, the second fused multiply-add operation is started one cycle earlier. As a result, the two fused multiply-add operations are completed in thirteen cycles as opposed to fourteen cycles. An additional partial cycle may be saved by feeding back un-rounded un-normalized data, resulting in a total savings of more than one cycle.

In exemplary embodiments of the present invention that provide un-rounded un-normalized feedback, two different schemes are utilized to handle the multiplier operand and addend operand cases. For the feedback to the multiplier operands, the un-rounded un-normalized result from an intermediate point in cycle F6 is fed back to the operand registers (cycle prior to F1). A rounding correction term is formed based on the precision of the output of the first operation (e.g., r5), the precision of the inputs to the second operation (e.g., r5, r2 and r7), and the normalization requirements of the fed back result. This correction term is added to the partial products in the counter tree. Normalization requirements are known at the end of F6 and during F7 it is known whether rounding requires incrementation or truncation. This information is signaled to the counter tree and the rounding correction term is either suppressed or enabled into the multiplier tree during cycle F1. The rounding correction term can be one of various combinations to be able to handle single or double precision feedback to either operand. Also, the special case of feeding back a result to both multiplier operands has to be considered.

The feedback to the addend operand is accomplished by first feeding back the normalized result's exponent in the F6 cycle and then a cycle later, F7, feeding back the normalized rounded result to the second pipeline stage of the addend. The addend dataflow path is only critical for the exponent difference calculation which determines the shift amount of the addend relative to the product. The significand is not critical and its alignment is delayed by the shift amount calculation to be started in cycle F2. Therefore, the normalized rounded result significand from F7 may be fed directly to a latch feeding the F2 cycle.

To correct for a dependency on the addend, B, exemplary embodiments of the present invention feed the partially normalized exponent of the result early, and, a cycle later feed the partially normalized rounded result significand back to the next operation. To be able to do this, an additional bit is utilized in the alignment. Rather than aligning a 53 bit double precision significand, 54 bits are utilized because rounding can increment a 53 bit significand of all ones to a 53 bit significand of one followed by 53 zeros. Since the alignment shift amount is calculated off of a normalized result exponent rather than after rounding, the additional bit of the significand needs to be maintained.

For a 7 stage fused multiply-add pipeline, the exponent is fed back after stage 6 to the input register of stage 1, thus having stage 7 of the prior instruction overlap with stage 1 of the dependent new instruction. In the following cycle, stage 7 feeds a rounded significand of the prior instruction to stage 2 of the new dependent instruction. No shifting alignment of the addend is accomplished in stage 1 and therefore, this stage can be bypassed. Thus, a dependency on an addend operand can be handled by feeding the normalized exponent from stage 6 to stage 1, the rounded significand from stage 7 to stage 2, and preserving an additional bit of the significand to be able to account for a carry out of the 53 bit significand.

For the two multiplier operands, A and C, an exemplary embodiment of the correction is as follows. Let P represent the product, then:

$$P = A \times C$$

If $A = A' + 2^{}-n$ where n=23 for single precision or 52 for double precision, and A' is the intermediate truncated result prior to complete normalization and rounding, then, $P = A \times C = (A' + 2^{}-n) \times C = A' \times C + 2^{**}-n \times C$. Note that feeding back only a partially normalized result has no effect on the value of the product as long as a significand with a corresponding exponent are fed back together. Only the rounding needs to be corrected, but having a partially normalized result makes the location of bit to increment more difficult.

Therefore, if the intermediate result prior to rounding, A', is multiplied by C in the multiplier's partial product array, a correction term needs to be added to correct for using A'. This correction term consists of C multiplied by $2^{**}-n$. If the intermediate result were normalized, the correction term is simply C shifted either by 23 or 52 bit positions depending on whether A is single or double precision. But with a partially normalized result that may need shifting by one more bit to the left, n may equal 23 or 24 for single precision, and 52 or 53 for double precision. With even less normalization completed, the location of rounding position creates more potential locations.

If C is the operand that is dependent on the prior operation, and $C = C' + 2^{**}-n$, where C' is the intermediate un-rounded un-normalized result, then:

$$P = A \times C = A \times (C' + 2^{}-n) = A \times C' + A \times 2^{}-n$$

In this case, the correction term is A shifted by 23 or 52 bit positions for a normalized intermediate result or 23, 24, 52, or 53 when the last shift of 1 bit left is skipped for the feed back path.

If both A and C are equal and dependent on the prior operation then:

$$P = (A' + 2^{}-n) \times (C' + 2^{}-n) = A' \times C' + A' \times 2^{}-n + C' \times 2^{}-n + 2^{**}(-2n); \text{ and}$$

$$P = A' \times C' + A' \times 2^{}(-n+1) + 2^{}-2n$$

For a dependency in the multiplier operands, exemplary embodiments of the present invention create a correction term based on the precision of the operation completing and whether or not normalization has been completed (i.e. is a shift-left-one (SL1) required). The correction term is added into the partial product array if an increment is needed for rounding.

In binary floating-point designs following the IEEE 754 floating point standard, all operands must be normalized unless they are very small, in the range of subnormal numbers. Starting with normalized operands, the multiply operation will produce a result with a leading one in one of two possible bit positions, requiring only a minimum shift. But, the addition operation can cause massive cancellation that may result in a large number of shifts being required. Typically, a leading zero anticipatory (LZA) circuit is designed to calculate the shift amount in parallel with the addition. Most LZAs produce an inexact guess of where the leading one will be, and can be off by as much as one bit position. Many normalizers are designed to take this into account and start by using multiple shifting levels to shift by the LZA amount, which is then followed by a correction shift. The correction shift requires detection of the most significant bit of data of the prior shifter and is utilized as a select line to choose whether to shift left by one more bit. This correction shift is slow since the select is not available early and must be re-powered to every bit of data. The correction shift could require a delay of up to 4 FO4 (delay of inverter fanning out to 4 signals). In a high-frequency design this is critical. Exemplary embodiments of the present invention described below skip the SL1 correction prior to bypassing the data to the next operand and instead correct for it.

Exemplary embodiments of the present invention feed an intermediate result to the next operation in a fused multiply-add pipeline prior to rounding, and in particular, prior to complete normalization. Exemplary embodiments of the present invention feed the data back prior to the last SL1 correction of the normalization but this could easily be expanded to be prior to any level of normalization. The difficulty in feeding the data back prior to even early normalization is that the data must be wider and there also needs to be masking of the least significant bits. Exemplary embodiments of the present invention reduce the critical amount of delay in the feedback path which is typically the critical path in the FPU.

Rather than shifting the data prior to feeding it back to the input operand registers, the data's significand and corresponding exponent are fed back with a possible additional bit of precision. If the leading bit is one, then the least significant bit is masked on input to the operand registers. This also effects the design of the rounding correction term described previously because the rounding could be adding one to two different bit locations; thus the correction term must be potentially shifted.

Part of the normalization, the SL1 correction, is skipped in the bypass path and delayed in the rounding path. In the bypass path, the SL1 correction controls masking of the LSB, as well as the shifting of a rounded correction term which is created in the following cycle. In the through path to the floating point registers, the SL1 correction can be delayed until after rounding and be used to select the final shifting of the output of the rounder. In this way, the shift left one correction only gates one bit in the critical cycle and performs most of the correction in the subsequent cycle after it has been re-powered. Exemplary embodiments of the present invention may be expanded to cover skipping the last four bits of shifting or even more steps of the normalizer, at the cost of added complexity and increasing bus width by the amount of the shifting skipped.

FIG. 1 is a block diagram of a FPU that may be utilized by exemplary embodiments of the present invention to implement a fused multiply add-operation with feedback prior to normalizing and rounding. Data 100 from a register file is provided and is input to a B1 register 110, an A1 register 111 and a C1 register 112. In an exemplary embodiment of the present invention, the A1 register 111 and C1 register 112 contain operands that are used in the multiplication portion of the floating point arithmetic operations. The B1 register 110 contains the addition operand. The contents of the A1 register 111 are input to a Booth decoder 130. The Booth decoder 130, Booth multiplexers 132 and counter tree/partial product reduction block 134 may be referred to collectively as a multiplier. The output of the Booth decoder is provided, through Booth multiplexers 132, to the counter tree/partial product reduction block 134. The contents of the C1 register 112 are input to a rounding correction block 180. The contents of the C1 register 112 are also input to the counter tree/partial product reduction block 134 by way of the Booth multiplexers 132.

The contents of the A1 register 111, the B1 register 110 and the C1 register 112 are input to an exponent difference block 120 to determine how to align the inputs to the adder 150 in the aligner 124. The output of the exponent difference block 120 is input to a B2 register 122, and the content of the B2 register 122 is input to an aligner 124. The aligner 124 may be implemented as a shifter and its function is to align the addition operand with the result of the multiplication performed in the multiplier 134. The aligner 124 provides an output that is stored in a B3 register 126. The contents of the B3 register 126 are input to a 3:2 counter 140.

The counter tree/partial product reduction block 134 provides two partial product outputs that are input to the 3:2 counter 140. The 3:2 counter 140 provides output to an adder 150 and to a leading zero indicator (LZA) 182. Based on the inputs to the adder 150, the LZA 182 predicts how much the output of the adder 150 will have to be shifted left. As is known in the art, the LZA 182 provides a good estimate of the amount of shifting required but it may be off by one position. The estimate from the LZA is input to the normalizer 160. The output of the adder 150 is also input to a normalizer 160 for normalization. Before the normalizing has been completed, an intermediate un-rounded un-normalized result is output and sent to the A1 register 111, the B1 register 110 and the C1 register 112. In addition, the output from the normalizer 160 is also input to the rounder 170 for rounding. The output from the normalizer 160 is input to the rounder 170 for rounding. The rounded result is output from the rounder 170. The rounder 170 outputs a signal to indicate whether or not an increment is needed for rounding. This indicator signal from the rounder 170 is input to the rounding correction block 180 for input to the counter tree/partial product reduction block 134. Also input to the rounding correction block 180 is an SL1 indicator from the normalizer 160 for indicating if the result needs to be shifted left one bit to become normalized. In addition, the rounded result may be input to the B2 register 122, the A1 register and/or the C1 register 112.

Figure 2:
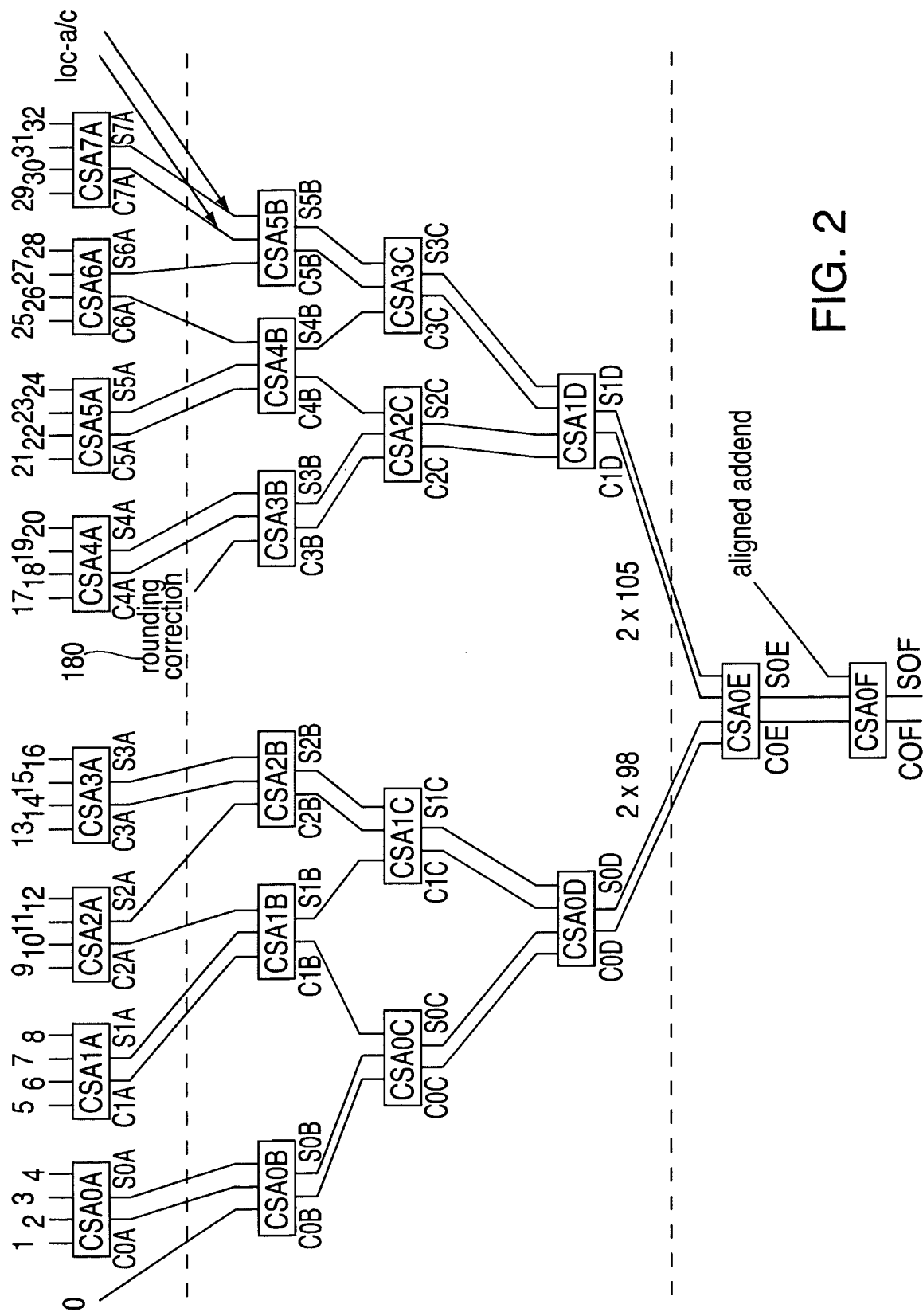
FIG. 2 illustrates one example of a carry save adder that is utilized by exemplary embodiments of the present invention.

FIG. 2 is an illustration of a carry save adder tree that is part of the multiplier in exemplary embodiments of the present invention. Note that the rounding correction 180 output provides an input to the carry save adder CSA3B. This input is utilized to indicate if the previously computed result was rounded upward. If so, the one is added into the partial products. Because of the propagation delay through the tree, the rounding can be added in a timely manner.

In exemplary embodiments of the present invention for providing un-rounded un-normalized intermediate results, the logic in the rounding correction term output from the rounding correction block 180 is calculated by the following formulas. The rounding_correction variable is added to the result of A×C to correct for the fact that A and/or C may not be rounded. DP_TARGET is a switch that is set to one when the target, or result, is to be expressed in double precision and the switch is set to zero when the target is to be expressed in single precision. A is the input data stored in the A1 register 111, B is the input data stored in the B1 register 110, and C is the input data stored in the C1 register 112. BYP_A is a switch that is set to one when A is an intermediate un-rounded result and reset to zero otherwise. BYP_C is a switch that is set to one when C is an intermediate un-rounded result and reset to zero otherwise. An SL1 indicator is an output from the LZA 302 and indicates if a SL1 needs to be applied to the data. The PP_round correction is added to the partial product to correct for A and/or C not being rounded. The rounder_chooses_to_increment is an indicator from the rounder that indicates whether to truncate or to increment.

```
Rounding_correction(23:106) <= (Zeros(23:52) & C(0:52) & '0') when
    ((DP_TARGET and BYP_A and not BYP_C and not SL1) = '1')
    OR
(Zeros(23:52) & C(0:53)) when ((DP_TARGET and BYP_A and not
BYP_C
    and SL1) = '1') OR
(Zeros(23:52) & A(0:52) & '0') when ((DP_TARGET and not BYP_A
and
    BYP_C and not SL1) = '1') OR
(Zeros(23:52) & A(0:53)) when ((DP_TARGET and not BYP_A and
BYP_C
    and SL1) = '1') O
(Zeros(23:51) & A(0:52) & '1' & '0') when
    ((DP_TARGET and BYP_A and BYP_C and not SL1) = '1')
    OR
(Zeros(23:51) & A(0:53) & '1') when ((DP_TARGET and BYP_A and
BYP_C
    and SL1) = '1') OR
(Zeros(23) & C(0:52) & Zeros(77:106)) when
    ((not DP_TARGET and BYP_A and not BYP_C and not SL1) =
    '1') OR
(Zeros(23) & C(0:53) & Zeros(78:106)) when
    ((not DP_TARGET and BYP_A and not BYP_C and   SL1) =
    '1') OR
(Zeros(23) & A(0:52) & Zeros(77:106)) when ((not DP_TARGET and
not
    BYP_A and BYP_C and not SL1) = '1') OR
(Zeros(23) & A(0:53) & Zeros(78:106)) when ((not DP_TARGET and
not
    BYP_A and BYP_C and SL1) = '1') OR
(A(0:52) & '1' & Zeros(77:106)) when
    ((not DP_TARGET and BYP_A and BYP_C and not SL1) = '1')
    OR
(A(0:53) & '1' & Zeros(78:106)) when ((not
    DP_TARGET and BYP_A and BYP_C and SL1) = '1'); and
PP_round_correction(23:106) <= (Round_correction(23: 106)) when
    (Rounder_chooses_to_increment = '1')
    else Zeros(23: 106);
```

Note that the 53 bits of A or C can be utilized independent of whether they are single or double precision since for single precision, bits 24 to 53 will be zero. In an exemplary embodiment of the present invention, this correction is based on DP_TARGET, BYP_A, BYP_C, and SL1 first. Once it is known whether the rounder is incremented or truncated, then there is an AND gate to suppress or to transmit this correction. The rounding correction block 180 may be implemented as a 12 way multiplexer followed by a 2 way AND gate.

Figure 3:
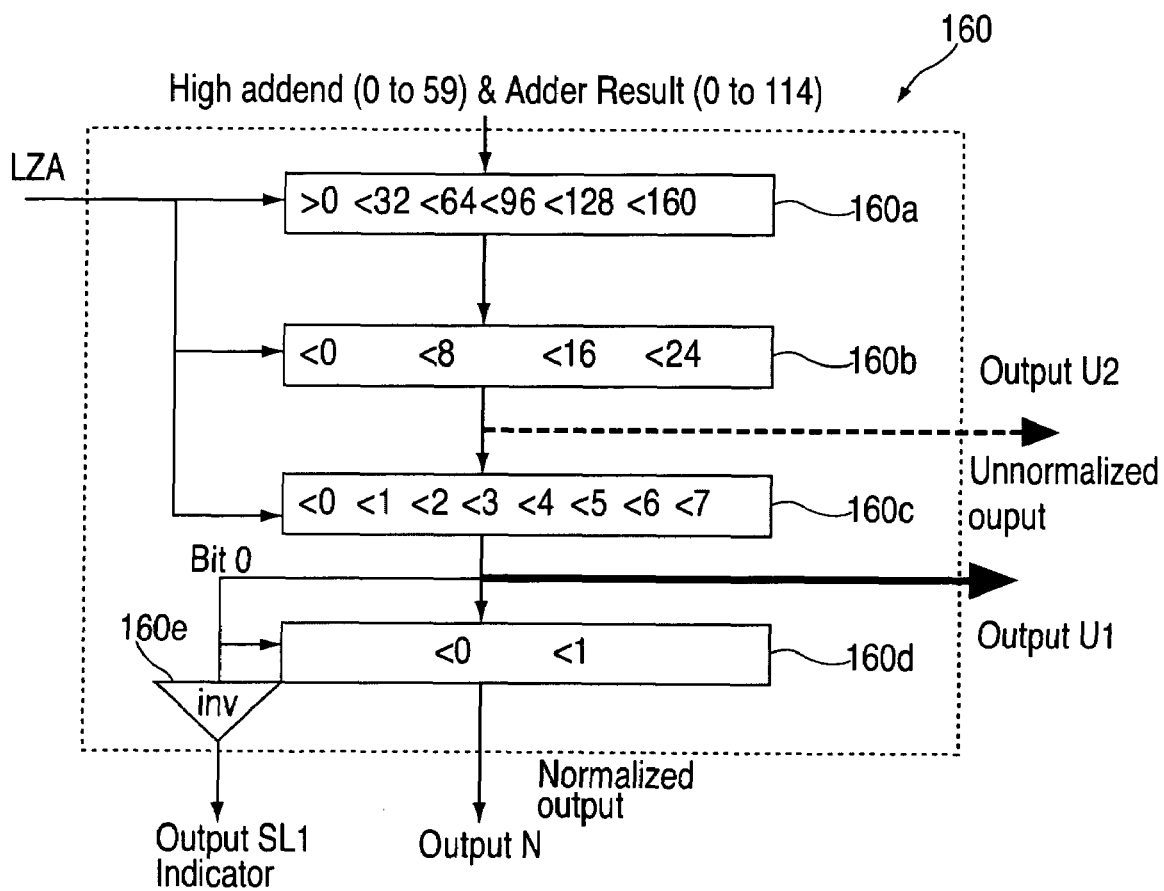
FIG. 3 is a block diagram of an exemplary normalizer that may be utilized by exemplary embodiments of the present invention.

FIG. 3 is a block diagram of an exemplary normalizer 160 that may be utilized by exemplary embodiments of the present invention to provide intermediate un-rounded un-normalized results. The normalizer 160 receives input from the LZA 182, the high addend from the adder 150 and the adder result from the adder 150. In exemplary embodiments of the present invention, the results of the LZA 182, the shift left estimate, is stored in an eight-bit word. Block 160a shifts the adder result left by 32, 64, 96, 128, and 160 bits depending on the value in the first three bits of the result word from the LZA 182. Block 160b shifts the adder result left by 0, 8, 16 or 24 bits depending on the value in bits four and five of the result word from the LZA 182. Block 160c shifts the adder result left by 0, 1, 2, 3, 4, 5, 6 or 7 bits depending on the value in the last three bits of the result word from the LZA 182. Block 160d shifts the adder result left by 0 or 1 bit depending on the value of the most significant bit (MSB). If the MSB is equal to zero, the result needs to be shifted left by one bit; otherwise, the result does not require any further shifting. Output from the normalizer 160 includes the SL1 indicator and the normalized output. FIG. 3 also depicts an intermediate un-normalized result, U1, being output before the last, one bit shift. In addition, FIG. 3 depicts an earlier intermediate un-normalized result, U2, being output before the third shift, this is a variation of the invention to allow any stage of the normalizer to be fed back to the operand registers 110, 111, and 112.

Figure 4:
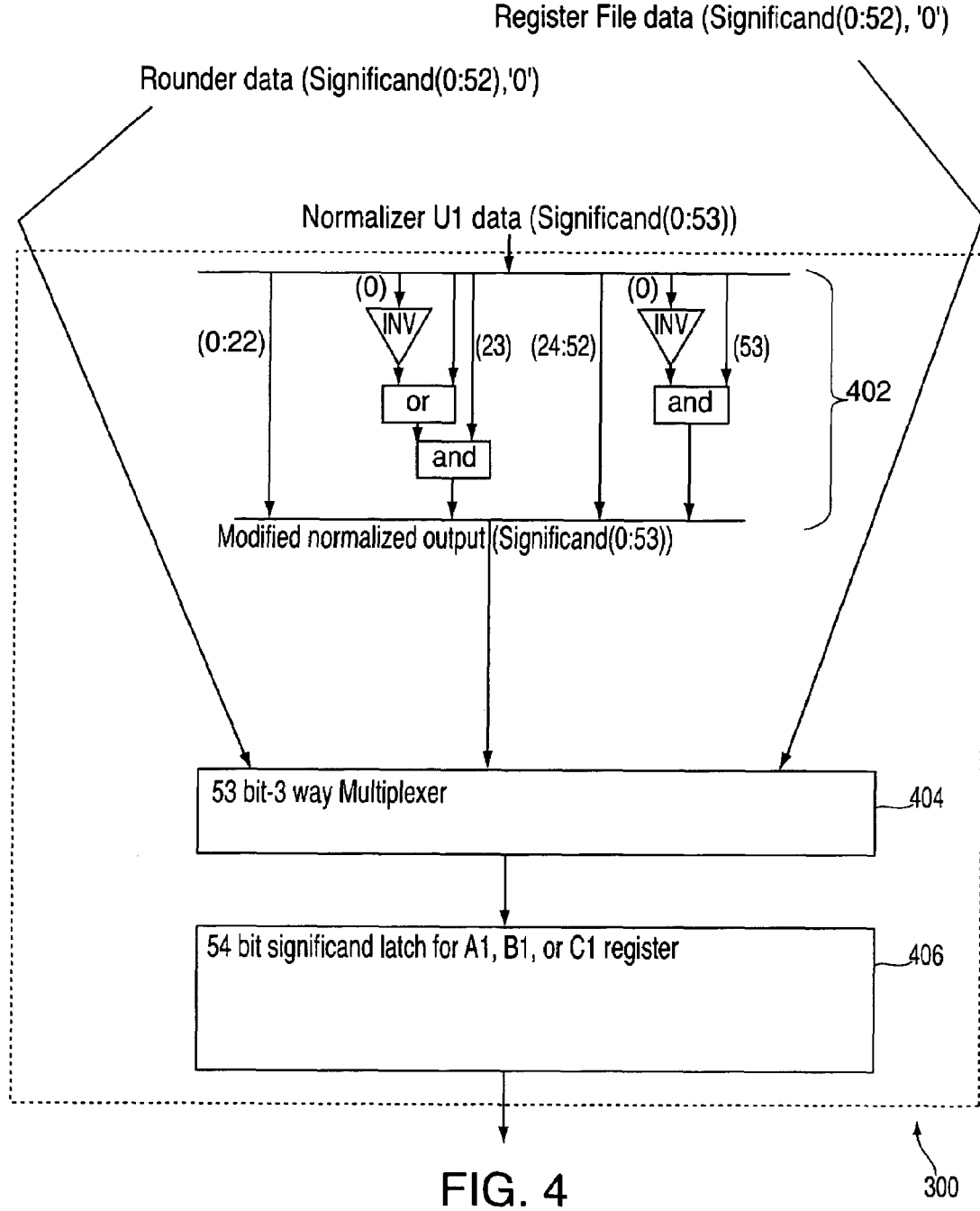
FIG. 4 is a flow diagram of an operand latch masking process that may be performed by exemplary embodiments of the present invention.

FIG. 4 is a flow diagram of an operand latch masking process that may be performed by exemplary embodiments of the present invention to provide intermediate un-rounded un-normalized results. The processing in FIG. 4 may be utilized by each of the A1 register 111, B1 register 110 and C1 register 112 to determine the value of the significand in each of these registers. Block 402 is utilized if the input data to the register is U1, an un-normalized result from the normalizer 160. An extra bit must be sent with the register data if a SL1 is required on the register data. Bits 0 to 22 are passed down to the output of block 402 labeled modified normalized output. If the data includes a double precision number, then bit 23 is passed down to the modified normalized output; otherwise bit 23 is reset to zero. Also, if the data is single precision and a SL1 should occur on the data, then bit 23 is passed down the modified normalized output, otherwise bit 23 is reset to zero. If the data is double precision and a SL1 should occur on the data, then bit 53 is passed down to the modified normalized output; otherwise, bit 53 is reset to zero.

The modified normalized output is input to block 404. Another input to block 404 is data from the register file with a 54$^{th}$ bit with a value of zero appended on to the right of the data from the register file. Also input to block 404 is rounded result data, or rounder data, from the rounder 170. Again, a 54$^{th}$ bit with a value of zero appended is appended onto the right of the rounder data. Block 404 is a three way multiplexer that selects between these three values to input to the A1 register 111, the B1 register 110 or the C1 register at block 406. This process is executed for each of the registers.

Figure 5:
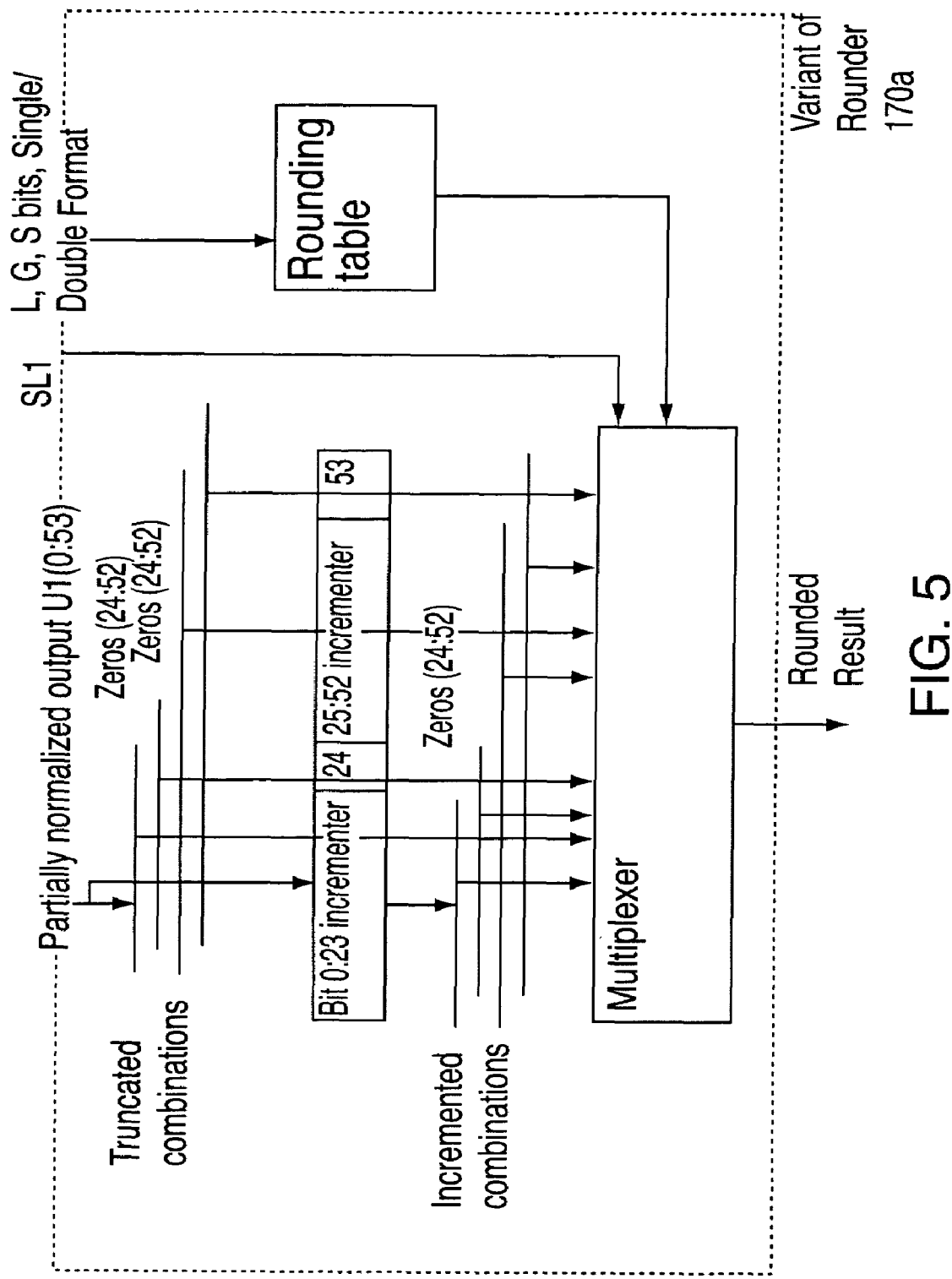
FIG. 5 is a block diagram of an exemplary optional rounder design with a delayed shift one that may be utilized by exemplary embodiment of the present invention.

FIG. 5 is a block diagram of an exemplary optional rounder 170a with a delayed SL1 that may be utilized by exemplary embodiments of the present invention. The rounder 170a receives partially normalized output, U1, and the SL1 indicator from the normalizer 160. Also input to the rounder 170a are the least significant bit, L, the guard bit, G, and the sticky bit, S, which represents if the intermediate result is inexact, and an indication if the result is single precision or double precision format. The rounder 170a creates all possible combinations for the partially normalized output: SL1 double precision truncated, don't SL1 double precision truncated, SL1 double precision incremented, don't SL1 double precision incremented, SL1 single precision truncated, don't SL1 single precision truncated, SL1 single precision incremented, don't SL1 single precision incremented. Based on the value in the SL1 indicator and the information in a rounding table, a multiplexer selects one of the values from the list of possible combinations.

Figure 6:
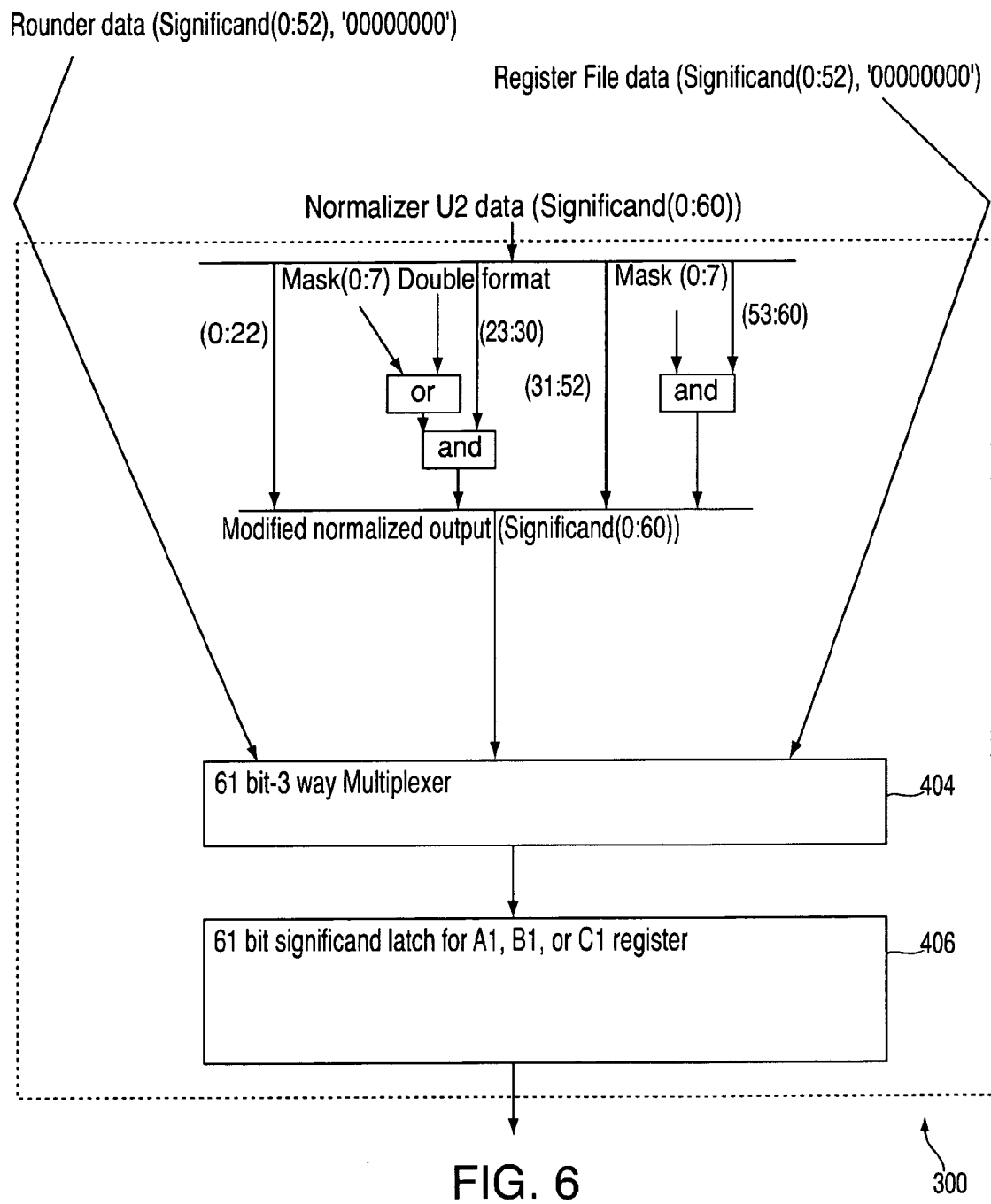
FIG. 6 is a flow diagram of an operand latch masking process that may be performed by exemplary embodiments of the present invention.

FIG. 6 is a flow diagram of an operand latch masking process that may be performed by exemplary embodiments of the present invention to provide intermediate un-rounded un-normalized results. The flow is similar to the flow described in reference to FIG. 4, except that it applies to un-normalized output from earlier in the shifting process (e.g., U2 in FIG. 4).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system configured to perform floating point arithmetic operations in a pipelined floating-point unit comprising multiple stages, the system comprising:
   an input register configured to receive an operand;
   arithmetic operation circuitry configured to perform an arithmetic operation upon the operand;
   a normalizer configured to provide feedback of an intermediate result of the arithmetic operation circuitry to the input register as a modified operand prior to completion of rounding and normalization in a final stage of the pipelined floating-point unit, and further configured to provide a normalizing indicator to a rounding correction block;
   the rounding correction block of the pipelined floating-point unit configured to perform a method comprising:
      performing a masking or shift operation on the modified operand in response to determining that the modified operand is in an un-normalized format to make the modified operand equivalent to a normalized truncated operand; and
      determining a rounding correction value as a function of a target precision and the normalizing indicator; and
   the pipelined floating-point unit configured to perform a method comprising:
      performing single precision incrementing of the modified operand in response to the rounding correction value indicating single precision and the rounding circuitry indicating the incrementing based on a result of a previous arithmetic operation; and
      performing double precision incrementing of the modified operand in response to the rounding correction value indicating double precision and the rounding circuitry indicating the incrementing based on the result of the previous arithmetic operation, thereby enabling the arithmetic operation to start at least one cycle before the previous arithmetic operation completes a final stage of the pipelined floating-point unit.

2. The system of claim 1 wherein the modified operand is an addend, a multiplier or a multiplicand.

3. The system of claim 1 wherein the modified operand is an un-rounded un-normalized intermediate result of the previous arithmetic operation.

4. The system of claim 1 wherein the shift operation is a shift left operation.

5. The system of claim 1 wherein the shift operation is a shift left one bit operation.

6. The system of claim 1 wherein the incrementing is for rounding the modified operand.

7. The system of claim 1 wherein the previous arithmetic operation is an addition operation.

8. The system of claim 1 wherein the previous arithmetic operation is a multiplication operation.

9. The system of claim 1 wherein the performing the masking or shift operation, the performing single precision incrementing and the performing double precision incrementing are responsive to normalization requirements of the modified operand.

10. A system configured to perform floating point arithmetic operations in a pipelined floating-point unit comprising multiple stages, the system comprising:
   a plurality of input registers configured to receive a plurality of operands;
   arithmetic operation circuitry configured to perform an arithmetic operation upon the plurality of operands;
   a normalizer configured to provide feedback of one or more intermediate results of the arithmetic operation circuitry to one or more of the plurality of input registers as one or more modified operands prior to completion of rounding using rounding circuitry and normalization in the pipelined floating-point unit, and further configured to provide a noramlizing indicator to a rounding correction block;
   the rounding correction block of the floating-point unit configured to perform a method comprising:
      performing a masking or shift operation on at least one of the one or more modified operands in response to determining that the at least one of the one or more modified operands is in an un-normalized format to make the at least one of the one or more modified operands equivalent in value to at least one normalized truncated operand; and
      determining a rounding correction value as a function of a target precision and the normalizing indicator; and
   the pipelined floating-point unit configured to perform a method comprising:
      performing single precision incrementing of one or more of the modified operands in response to the rounding correction value indicating single precision and the rounding circuitry indicating the incrementing based on a result of a previous arithmetic operation; and
      performing double precision incrementing of one or more of the modified operands in response to the rounding correction value indicating double precision and the rounding circuitry indicating the incrementing based on the result of the previous arithmetic operation, thereby enabling the arithmetic operation to start at least one cycle before the previous arithmetic operation completes a final stage of the pipelined floating-point unit.

11. The system of claim 10 wherein the plurality of operands are an addend, a multiplier and a multiplicand.

12. The system of claim 10 wherein one or more of the modified operands are an un-rounded un-normalized result of the previous arithmetic operation.

13. A method for performing floating point arithmetic operations in a pipelined floating-point unit comprising multiple stages, the method comprising:

performing an arithmetic operation upon an operand using arithmetic operation circuitry;

providing feedback of an intermediate result of the arithmetic operation circuitry from a normalizer to an input register as a modified operand prior to completion of rounding using rounding circuitry and normalization in the pipelined floating-point unit;

providing a normalizing indicator to a rounding correction block;

performing a masking or shift operation on the modified operand in response to determining that the modified operand is in an un-normalized format to make the modified operand equivalent to a normalized truncated operand;

determining a rounding correction value as a function of a target precision and the normalizing indicator using the rounding correction block;

performing single precision incrementing of the modified operand in response to the rounding correction value indicating single precision and the rounding circuitry indicating the incrementing based on a result of a previous arithmetic operation; and performing double precision incrementing of the modified operand in response to the rounding correction value indicating double precision and the rounding circuitry indicating the incrementing based on the result of the previous arithmetic operation, thereby enabling the arithmetic operation to start at least one cycle before the previous arithmetic operation completes a final stage of the pipelined floating-point unit.

14. The method of claim 13 wherein the operand is an addend, a multiplier or a multiplicand.

15. The method of claim 13 wherein the modified operand is an un-rounded un-normalized intermediate result of the previous arithmetic operation.

16. The method of claim 13 wherein the shift operation is a shift left one bit operation.

17. A computer program product for performing floating point arithmetic operations in a pipelined floating-point unit comprising multiple stages, the computer program product comprising:

a computer readable storage medium readable by a processing circuit and storing instructions for execution by the processing circuit for performing a method comprising:

performing an arithmetic operation upon an operand using arithmetic operation circuitry;

providing feedback of an intermediate result of the arithmetic operation to an input register as a modified operand prior to completion of rounding and normalization in the pipelined floating-point unit;

providing a normalizing indicator to a rounding correction block;

performing a masking or shift operation on the modified operand in response to determining that the modified operand is in an un-normalized format to make the modified operand equivalent to a normalized truncated operand;

determining a rounding correction value as a function of a target precision and the normalizing indicator using the rounding correction block;

performing single precision incrementing of the modified operand in response to the rounding correction value indicating single precision and an indication of the incrementing based on a result of a previous arithmetic operation; and performing double precision incrementing of the modified operand in response to the rounding correction value indicating double precision and the indication of the incrementing based on the result of the previous arithmetic operation, thereby enabling the arithmetic operation to start at least one cycle before the previous arithmetic operation completes a final stage of the pipelined floating-point unit.

18. The computer program product of claim 17 wherein the operand is an addend, a multiplier or a multiplicand.

19. The computer program product of claim 17 wherein the modified operand is an un-rounded un-normalized intermediate result of the previous arithmetic operation.

20. The computer program product of claim 17 wherein the shift operation is a shift left one bit operation.

* * * * *